(12) United States Patent
Kim (10) Patent No.: US 12,181,780 B2
(45) Date of Patent: Dec. 31, 2024

(54) CAMERA MODULE

(71) Applicant: Samsung Electro-Mechanics Co., Ltd, Suwon-si (KR)

(72) Inventor: Yong Gu Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 798 days.

(21) Appl. No.: 17/207,848

(22) Filed: Mar. 22, 2021

(65) Prior Publication Data

US 2022/0066289 A1 Mar. 3, 2022

(30) Foreign Application Priority Data

Aug. 28, 2020 (KR) .................. 10-2020-0108989

(51) Int. Cl.
*G03B 17/12* (2021.01)
*G02B 7/09* (2021.01)
(Continued)

(52) U.S. Cl.
CPC .............. *G03B 17/12* (2013.01); *G02B 7/09* (2013.01); *G02B 7/10* (2013.01); *H04N 23/51* (2023.01);
(Continued)

(58) Field of Classification Search
CPC ............ G03B 17/12; G03B 2205/0015; G03B 2205/0069; G03B 5/00; G03B 30/00; G03B 3/10; G03B 13/36; G03B 13/03; G02B 7/09; G02B 7/08; G02B 7/10; G02B 7/021; G02B 7/02; H04N 23/51; H04N 23/55; H04N 23/57
See application file for complete search history.

(56) References Cited

U.S. PATENT DOCUMENTS 9,106,902 B2 8/2015 Shin et al.
10,914,912 B2 2/2021 Park et al.
(Continued)

FOREIGN PATENT DOCUMENTS

CN 111239952 A 6/2020
JP H06-208163 A 7/1994
(Continued)

OTHER PUBLICATIONS

Korean Office Action issued on Nov. 11, 2021 in corresponding Korean Patent Application No. 10-2020-0108989 (6 pages in English and 5 pages in Korean).
(Continued)

*Primary Examiner* — Cara E Rakowski
(74) *Attorney, Agent, or Firm* — NSIP Law (57) ABSTRACT

A camera module is provided. The camera module includes a lens barrel configured to accommodate a lens, a barrel holder configured to be coupled to the lens barrel, a first reinforcing member, disposed on the lens barrel, a second reinforcing member, disposed on the barrel holder, and configured to be melt-coupled to the first reinforcing member, and a driving unit, configured to move the lens barrel and the barrel holder in an optical axis direction. A driving coil of the driving unit is disposed on a housing of the camera module, and a driving magnet of the driving unit is disposed on the barrel holder.

8 Claims, 9 Drawing Sheets

(51) Int. Cl.
    *G02B 7/10*      (2021.01)
    *H04N 23/51*     (2023.01)
    *H04N 23/55*     (2023.01)
    *G02B 27/64*     (2006.01)

(52) U.S. Cl.
    CPC ........... *H04N 23/55* (2023.01); *G02B 27/646* (2013.01); *G03B 2205/0015* (2013.01)

(56) References Cited

U.S. PATENT DOCUMENTS

| | | | |
|---|---|---|---|
| 2019/0052782 A1* | 2/2019 | Sung | G03B 17/12 |
| 2020/0116970 A1* | 4/2020 | Yao | G02B 7/09 |
| 2020/0166725 A1 | 5/2020 | Park et al. | |
| 2021/0029280 A1* | 1/2021 | Kim | G03B 17/12 |

FOREIGN PATENT DOCUMENTS

| | | | |
|---|---|---|---|
| JP | 2008-209913 A | 9/2008 | |
| KR | 10-2010-0022903 A | 3/2010 | |
| KR | 10-2016-0006910 A | 1/2016 | |
| KR | 10-2020-0063522 A | 6/2020 | |

OTHER PUBLICATIONS

Chinese Office Action Issued on Mar. 27, 2024, in Counterpart Chinese Patent Application No. 202110812442.6 (5 Pages in Chinese, 8 Pages in English).

\* cited by examiner

CAMERA MODULE

CROSS-REFERENCE TO RELATED APPLICATION(S)

This application claims the benefit under 35 USC 119(a) of Korean Patent Application No. 10-2020-0108989 filed on Aug. 28, 2020 in the Korean Intellectual Property Office, the entire disclosure of which is incorporated herein by reference for all purposes.

BACKGROUND

1. Field

The following description relates to a camera module that performs autofocusing.

2. Description of Related Art

Camera modules include lens modules. A lens module includes a lens barrel that accommodates a lens and a barrel holder that facilitates the driving of the lens barrel. The lens barrel and barrel holder are joined through an adhesive applied between the lens barrel and the barrel holder. However, since an adhesive may be easily deformed by heat, the position of the lens barrel relative to the barrel holder may be distorted during the manufacturing process of the camera module. Since the change in a position of the lens barrel due to thermal deformation of the adhesive impairs the resolution of the camera module, development of a camera module that enables a firm binding between the lens barrel and the barrel holder may be necessary.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, a camera module includes a lens barrel, configured to accommodate a lens; a barrel holder, configured to be coupled to the lens barrel; a first reinforcing member, disposed on the lens barrel; a second reinforcing member, disposed on the barrel holder, and configured to be melt-coupled to the first reinforcing member; and a driving unit, configured to move the lens barrel and the barrel holder in an optical axis direction, wherein a driving coil of the driving unit is disposed on a housing of the camera module, and a driving magnet of the driving unit is disposed on the barrel holder.

The first reinforcing member may be disposed on a circumferential surface of the lens barrel, and wherein the second reinforcing member is disposed on an inner peripheral surface of the barrel holder facing the first reinforcing member.

A bonding member may be disposed at a boundary area between the first reinforcing member and the second reinforcing member.

The first reinforcing member may include a protrusion member that protrudes in a circumferential direction of the lens barrel.

The barrel holder may be provided with a groove that is configured to receive the protrusion member, wherein the second reinforcing member is disposed in the groove.

The protrusion member may be provided with irregularities disposed thereon.

In a general aspect, a camera module includes a lens barrel, configured to accommodate a lens; a barrel holder, configured to be coupled to the lens barrel; a first reinforcing member, disposed on the lens barrel; a second reinforcing member, disposed on the barrel holder, and configured to be melt-coupled to the first reinforcing member; and a driving unit, configured to move the lens barrel and the barrel holder in a direction intersecting an optical axis, wherein a driving coil of the driving unit is disposed on a housing of the camera module, and a driving magnet of the driving unit is disposed on the barrel holder.

The first reinforcing member may include a protrusion member that protrudes in a circumferential direction of the lens barrel.

The barrel holder may be provided with a groove that is configured to receive the protrusion member, wherein the second reinforcing member is disposed in the groove.

The camera module may include a movable frame, configured to move in a direction of the optical axis together with the barrel holder.

The movable frame may include a first movable frame, configured to support the barrel holder, in such a manner that the barrel holder moves in a first direction intersecting the optical axis; and a second movable frame, configured to support the first movable frame, in such a manner that the first movable frame moves in a second direction intersecting the optical axis.

The camera module may include a first ball bearing, disposed between the barrel holder and the first movable frame; and a second ball bearing, disposed between the first movable frame and the second movable frame.

In a general aspect, an electronic device includes a camera module, including a lens barrel; a barrel holder, configured to be coupled to the lens barrel; a first reinforcing member, disposed on the lens barrel; a second reinforcing member, disposed on the barrel holder, and configured to be coupled to the first reinforcing member; a first driving member, configured to move the lens barrel and the barrel holder in an optical axis direction; and a second driving member, configured to move the lens barrel and the barrel holder in a direction perpendicular to the optical axis direction; wherein a driving coil of the driving unit is disposed on a housing of the camera module, and a driving magnet of the driving unit is disposed on the barrel holder.

The first reinforcing device may be disposed on the lens barrel, and the second reinforcing device is disposed on the barrel holder.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed, as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible, as will be apparent after gaining an understanding of the disclosure of this application.

The drawings may not be to scale, and the relative sizes, proportions, and depictions of elements in the drawings may be exaggerated for clarity, illustration, and convenience.

The camera module described herein may be mounted on a portable electronic product. In an example, the camera module may be mounted on a portable telephone, a notebook computer, or the like. However, the range of use of the camera module according to the example is not limited to the aforementioned electronic products. In an example, the camera module may be mounted on front and rear surfaces of all electronic devices in which the camera module may be mounted.

The camera module is configured to enable autofocusing. In an example, the lens barrel of the camera module may be configured to move in an optical axis direction or a direction intersecting the optical axis. The position of the lens barrel of the camera module is fixed by the driving unit in an inactive state. For example, the position of the lens barrel may be fixed by the magnetic force generated between the driving coil and the driving magnet. However, since the magnetic force generated between the driving coil and the driving magnet in the inactive state of the camera module is quite weak, an abnormal movement of the lens barrel due to external impacts may be caused. Abnormal movement of the lens barrel not only causes noise of the camera module, but also causes detachment of the lens barrel from the barrel holder, thereby deteriorating the performance of the camera module and causing a malfunction of the camera module.

The examples prevent the above-described problems, and a camera module that improves the coupling stability of the lens barrel by strengthening the coupling force between the lens barrel and the barrel holder may be provided. In an example, in the camera module, a reinforcing member having high rigidity may be integrally formed with each of the lens barrel and the barrel holder, and bonding between the lens barrel and the barrel holder may be strengthened through bonding between the reinforcing members. As another example, in the camera module, a reinforcing member having a high melting point may be integrally formed on each of the lens barrel and the barrel holder, and the bonding force between the lens barrel and the barrel holder may be strengthened through fusion bonding between the reinforcing members.

Hereinafter, an example of a camera module including the features described above will be described.

Figure 1:
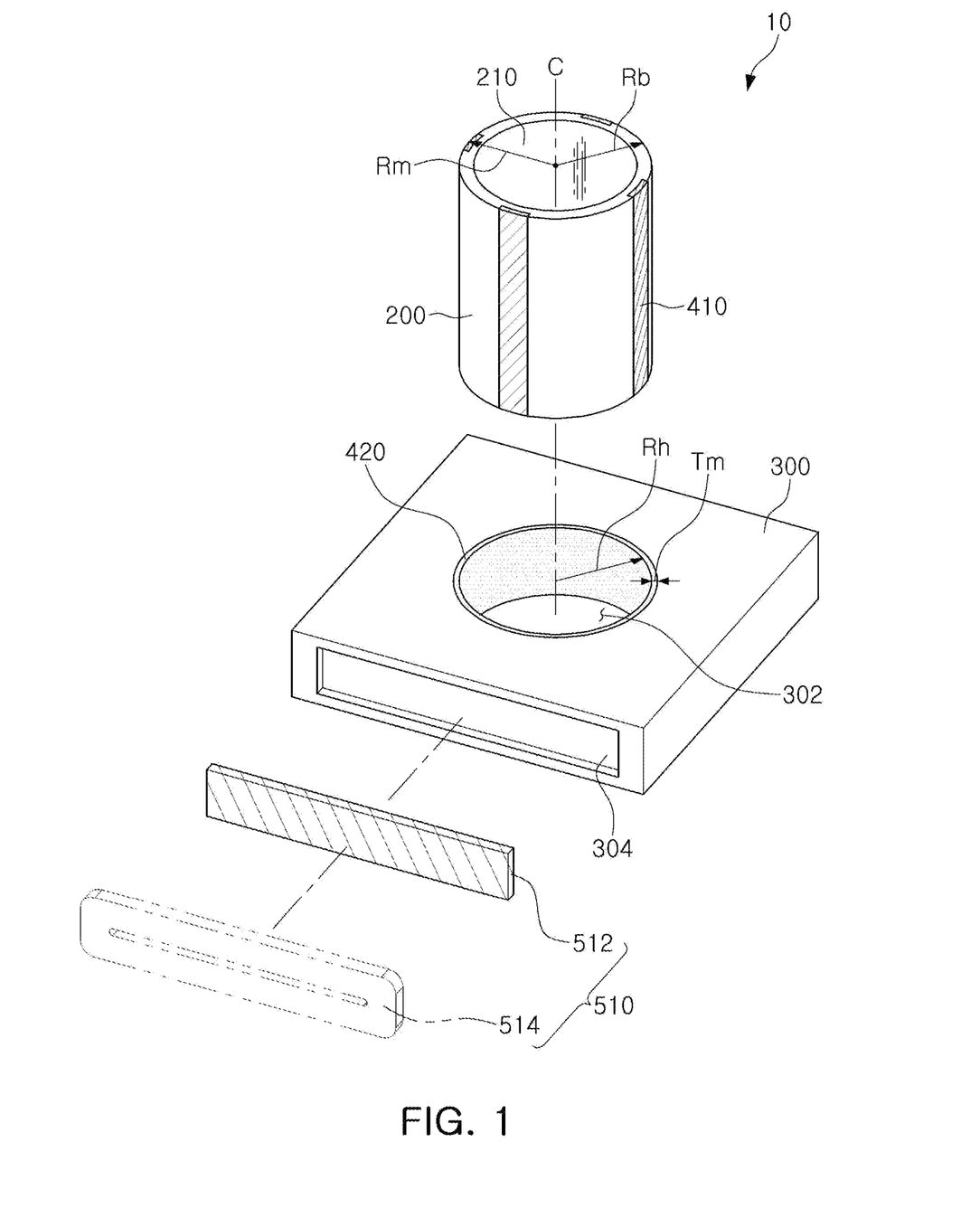
FIG. 1 is an exploded perspective view of an example camera module, in accordance with one or more embodiments.

First, a camera module according to an example will be described with reference to FIGS. 1 to 3.

A camera module 10, in accordance with one or more embodiments, may include a lens barrel 200, a barrel holder 300, and a first driving unit 510. The camera module 10 may further include a configuration necessary for imaging. In an example, the camera module 10 may further include an image sensor 900, and a housing 100 to accommodate the above-described configurations (see FIG. 3).

The lens barrel 200 may be formed to have a substantially cylindrical shape. However, the shape of the lens barrel 200 is not limited to a cylinder. In an example, the lens barrel 200 may be formed in the shape of a polygonal column, such as a quadrangular column or a hexagonal column. The lens barrel 200 is configured to accommodate one or more lens 210. In an example, one or more lenses 210 may be sequentially stacked in the lens barrel 200 in an optical axis C direction.

The barrel holder 300 is configured to be coupled to the lens barrel 200. In an example, an open hole 302 may be formed in the center of the barrel holder 300 such that the lens barrel 200 may be inserted thereinto. The hole 302 may be open in the optical axis (C) direction. The center of the hole 302 may be formed to coincide with the optical axis C of the lens barrel 200. A radius Rh of the hole 302 may be substantially equal to, or greater than, an outermost angle radius Rb of the lens barrel 200. The barrel holder 300 may be configured to receive a portion of the first driving unit 510. In an example, a mounting groove 304 may be formed in one side of the barrel holder 300, such that a portion of the first driving unit 510 may be disposed.

The first driving unit 510 is configured to enable autofocusing of the camera module 10. In an example, the first driving unit 510 may move the lens barrel 200 and the barrel holder 300 in the optical axis (C) direction. The first driving unit 510 may include a first driving magnet 512 and a first driving coil 514. The first driving magnet 512 and the first driving coil 514 may be disposed on different members of the camera module 10, to face each other. For example, the first driving magnet 512 may be disposed in the mounting groove 304 of the barrel holder 300, and the first driving coil 514 may be disposed in the housing 100 of the camera module 10.

The camera module 10 may further include a first reinforcing member 410 and a second reinforcing member 420 that reinforce binding between the lens barrel 200 and the barrel holder 300. The respective reinforcing members 410 and 420 may have characteristics different from characteristics of the lens barrel 200 and the barrel holder 300. In an example, the reinforcing members 410 and 420 may be formed of a material having greater rigidity than the lens barrel 200 and the barrel holder 300. As another example, the reinforcing members 410 and 420 may be formed of a material having a higher melting point than the lens barrel 200 and the barrel holder 300. For reference, in this example, the lens barrel 200 and the barrel holder 300 may be formed of a plastic material, and the reinforcing members 410 and 420 may be formed of a metal.

The reinforcing members 410 and 420 may respectively be formed on the lens barrel 200 and the barrel holder 300. In an example, the first reinforcing member 410 may be formed on the lens barrel 200, and the second reinforcing member 420 may be formed in the barrel holder 300.

The first reinforcing member 410 may be formed on the circumferential surface of the lens barrel 200. The first reinforcing member 410 may be multiple in number, and may be formed at predetermined intervals on the circumferential surface of the lens barrel 200 around the optical axis C. In an example, the first reinforcing member 410 may be formed at an interval of 90 degrees on the circumferential surface of the lens barrel 200 around the optical axis C. However, the formation interval of the first reinforcing member 410 is not limited to 90 degrees. In an example, the first reinforcing member 410 may also be formed at an interval of 60 degrees or 120 degrees on the circumferential surface of the lens barrel 200 around the optical axis C. The first reinforcing member 410 may be formed to have substantially the same length as that length of the lens barrel 200. In an example, the first reinforcing member 410 may be formed to extend from a lower end of the lens barrel 200 to an upper end of the lens barrel 200. However, this is only an example, and the first reinforcing member 410 may not necessarily be formed to have the same length as the lens barrel 200. In an example, the length of the first reinforcing member 410 may be less than the height of the lens barrel 200.

The first reinforcing member 410 may be formed to protrude outwardly from the circumferential surface of the lens barrel 200. For example, a distance Rm or radius from the optical axis C or the center of the lens barrel 200 to an outermost angle of the first reinforcing member 410 may be greater than an outermost angle radius Rb of the lens barrel 200. However, Rm is not necessarily greater than Rb. In an example, Rm may be formed to have the same size as Rb so that the lens barrel 200 may be easily fitted into the hole 302 of the barrel holder 300. In an example, the first reinforcing member 410 may be formed of a metal material, and may be integrally formed with the lens barrel 200. In an example, the first reinforcing member 410 may be integrally formed with the lens barrel 200 through an insert injection method. Therefore, the first reinforcing member 410 may be firmly bound to the lens barrel 200 and may not be easily separated or detached from the lens barrel 200 by external impacts.

The second reinforcing member 420 may be formed on the barrel holder 300. Specifically, the second reinforcing member 420 may be formed as an inner peripheral surface of the hole 302. In a non-limiting example, the second reinforcing member 420 may have a shape substantially consistent with that of the hole 302. In an example, the second reinforcing member 420 may have a cylindrical shape having a predetermined thickness Tm. The thickness Tm of the second reinforcing member 420 may be determined by the outermost angle radius Rb of the lens barrel 200 and the radius Rh of the hole 302. In an example, the thickness Tm of the second reinforcing member 420 may be less than a deviation (Rh-Rb) between the outermost angle radius Rb of the lens barrel 200 and the radius Rh of the hole 302 or may be equal to the deviation (Rh-Rb). In an example, the second reinforcing member 420 may be formed of a metal material, and may be integrally formed with the barrel holder 300. In an example, the second reinforcing member 420 may be integrally formed with the barrel holder 300 through an insert injection method. Therefore, the second reinforcing member 420 may be firmly bound to the barrel holder 300 and may not be easily separated or detached from the barrel holder 300 by external impacts.

Figure 2:
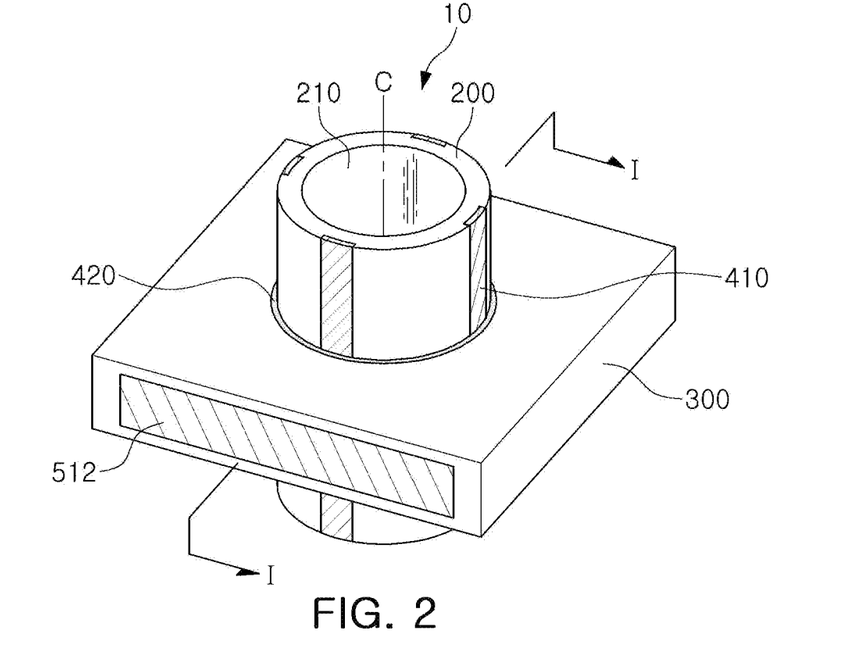
FIG. 2 is a perspective view illustrating the example camera module illustrated in FIG. 1.
Figure 3:
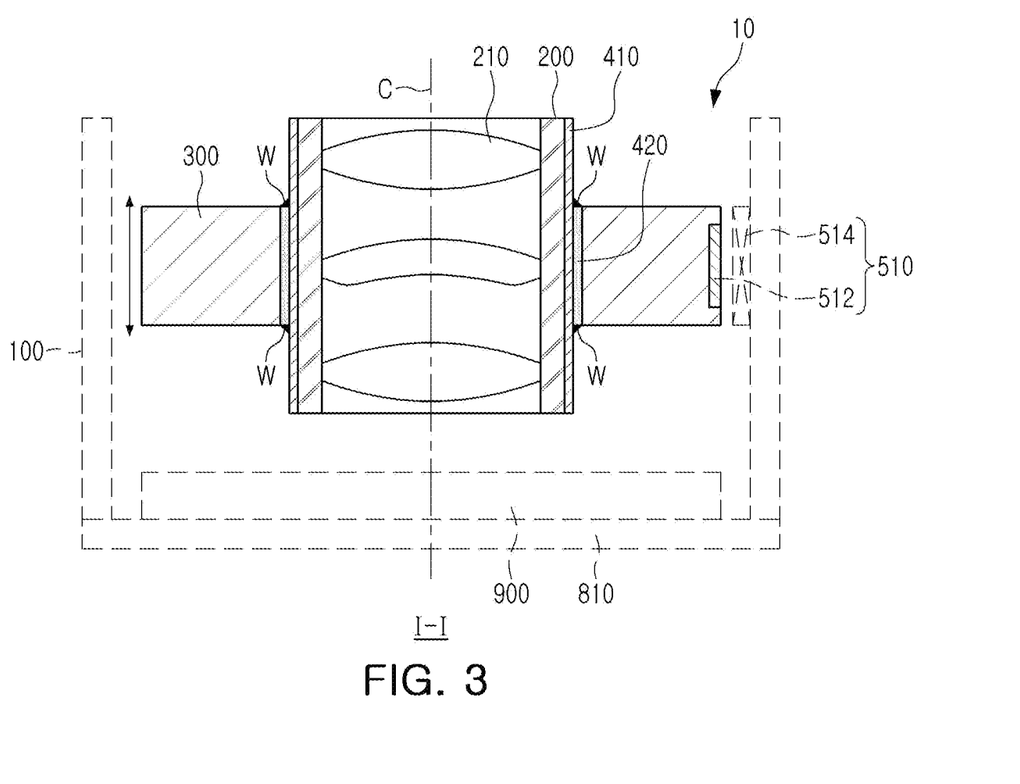
FIG. 3 is a cross-sectional view of the example camera module illustrated in FIG. 2.

The lens barrel 200 and the barrel holder 300 may be combined as illustrated in FIGS. 2 and 3. In an example, the lens barrel 200 may be coupled to the barrel holder 300 in a fitting manner in the hole 302 of the barrel holder 300. The lens barrel 200 and the barrel holder 300 may be rigidly coupled by a bonding of the respective reinforcing members 410 and 420. A bonding portion W may be formed at a boundary between the first reinforcing member 410 and the first reinforcing member 420. The permanent coupling between the lens barrel 200 and the barrel holder 300 may be obtained by fusion bonding between the first reinforcing member 410 and the first reinforcing member 420.

The melt bonding (W) between the first reinforcing member 410 and the second reinforcing member 420 may be performed by a method such as, but not limited to, laser welding.

The lens barrel 200 and the barrel holder 300 may move in the direction of the optical axis C. Specifically, the lens barrel 200 may move in the optical axis (C) direction by an interaction between the first driving magnet 512 mounted on the barrel holder 300 and the first driving coil 514 disposed on the housing 100.

The housing 100 may be configured to accommodate the lens barrel 200, the barrel holder 300, the first driving unit 510, a substrate 810, and the image sensor 900. The housing 100 may be configured in a form in which upper and lower portions are open. However, the open portion of the housing 100 is not limited to the upper and lower portions. In an example, at least one side of the housing 100 may be formed to be open as necessary. The substrate 810 may be disposed in a lower portion of the housing 100. The image sensor 900 and other electronic components that control the image sensor 900 may be mounted on the substrate 810. An electric circuit may be printed on the substrate 810. In an example, an electric circuit to transmit a control signal to the image sensor 900 and the first driving unit 510 may be printed on the substrate 810. The substrate 810 may have a multilayer structure. In an example, the substrate 810 may be formed of a laminated structure of a circuit board on which an electric circuit is printed.

In the example of the camera module 10 configured as above, the lens barrel 200 and the barrel holder 300 may be coupled to each other by fusion bonding between the reinforcing members 410 and 420 having relatively high rigidity, thereby exhibiting constant and reliable camera performance even in the example of external and internal impacts.

Figure 4:
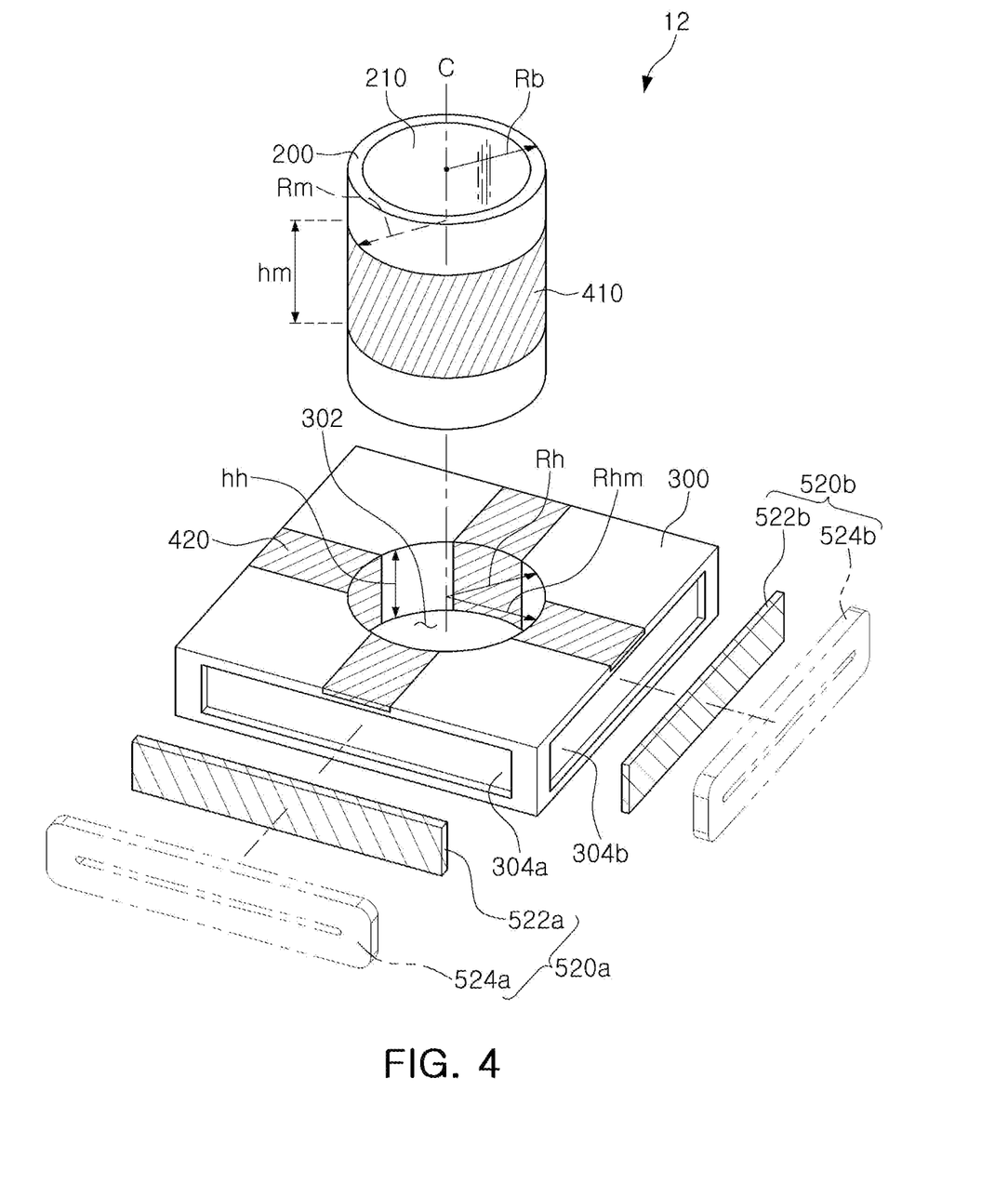
FIG. 4 is an exploded perspective view of an example camera module, in accordance with one or more embodiments.

Next, an example camera module, in accordance with one or more embodiments, will be described with reference to FIGS. 4 to 6.

A camera module 12, according to an example, may include a lens barrel 200, a barrel holder 300, and a second driving unit 520. The camera module 12 may further include a configuration necessary for imaging. In an example, the camera module 12 may further include an image sensor 900, a substrate 810, and a housing 100 to accommodate the above-described configuration (see FIG. 6).

The lens barrel 200 may be formed in a substantially cylindrical shape. However, the shape of the lens barrel 200 is not limited to a cylinder. In an example, the lens barrel 200 may be formed in the shape of a polygonal column, such as a quadrangular column or a hexagonal column. The lens barrel 200 is configured to accommodate one or more lenses 210. For example, one or more lenses 210 may be sequentially stacked in the lens barrel 200 in the optical axis C direction.

The barrel holder 300 is configured to be coupled to the lens barrel 200. In an example, an open hole 302 may be formed in the center of the barrel holder 300 into which the lens barrel 200 may be inserted. The hole 302 may be open in the optical axis (C) direction. The center of the hole 302 may be formed to coincide with the optical axis C of the lens barrel 200. A radius Rh of the hole 302 may be substantially equal to, or greater than, an outermost angle radius Rb of the lens barrel 200. The barrel holder 300 may be configured to receive a portion of the second driving unit 520. In an example, in two side surfaces of the barrel holder 300, mounting grooves 304a and 304b, in which some components of the second driving unit 520 may be disposed, may be formed.

The second driving unit 520 (520a and 520b) is configured to perform camera shake correction of the camera module 12. In an example, the second driving unit 520 (520a and 520b) may move the lens barrel 200 and the barrel holder 300 in a direction intersecting the optical axis C. The second driving unit 520 (520a and 520b) may include second driving magnets 522a and 522b, and second driving coils 524a and 524b. The respective second driving magnets 522a and 522b and the second driving coils 524a and 524b may be disposed to face each other. In an example, the second driving magnets 522a and 522b may be respectively disposed in the mounting grooves 304a and 304b of the barrel holder 300, and the respective second driving coils 524a and 524b may be disposed in the housing 100 of the camera module 12.

The camera module 12 may further include a first reinforcing member 410 and a second reinforcing member 420 that strengthen the binding between the lens barrel 200 and the barrel holder 300. In a non-limiting example, the reinforcing members 410 and 420 may be formed of a material different from a material of the lens barrel 200 and a material of the barrel holder 300. In an example, the reinforcing members 410 and 420 may be formed of a material having greater rigidity than the material of the lens barrel 200 and the barrel holder 300. As another example, the reinforcing members 410 and 420 may be formed of a material having a higher melting point than a melting point of the lens barrel 200 and the barrel holder 300. For reference, in a non-limiting example, the lens barrel 200 and the barrel holder 300 may be formed of plastic, and the reinforcing members 410 and 420 may be formed of a metal.

The reinforcing members 410 and 420 may respectively be formed on the lens barrel 200 and the barrel holder 300. In an example, the first reinforcing member 410 may be formed on the lens barrel 200, and the second reinforcing member 420 may be formed on the barrel holder 300. The first reinforcing member 410 may be formed on the circumferential surface of the lens barrel 200. In an example, the first reinforcing member 410 may be formed in a long circular shape along the circumferential surface of the lens barrel 200. The first reinforcing member 410 may be formed to protrude outwardly from the circumferential surface of the lens barrel 200. In an example, a distance Rm from the center of the lens barrel 200 to an outermost portion of the first reinforcing member 410 may be greater than an outermost angle radius Rb of the lens barrel 200. However, this is only an example, and Rm may not necessarily be greater than Rb. In an example, Rm may be formed to have the same size as Rb such that the lens barrel 200 may be easily fitted into the hole 302 of the barrel holder 300. The first reinforcing member 410 may be formed to have a predetermined size on the circumferential surface of the lens barrel 200. In an example, a formation height hm of the first reinforcing member 410 may be greater than a depth hh of the hole 302.

The first reinforcing member 410 may be formed of a metal material, and may be integrally formed with the lens barrel 200. In an example, the first reinforcing member 410 may be integrally formed with the lens barrel 200 through an insert injection method. Therefore, the first reinforcing member 410 may be firmly bound to the lens barrel 200 and may not be easily separated or detached from the lens barrel 200 by external impacts.

The second reinforcing member 420 may be formed on the barrel holder 300. Specifically, the second reinforcing member 420 may be formed on the inner circumferential surface of the hole 302 and on the upper surface of the barrel holder 300. In an example, the second reinforcing member 420 extends from the edge of the barrel holder 300 to the hole 302 along the upper surface of the barrel holder 300, and may then extend to the lower end of the hole 302 along the inner circumferential surface of the hole 302. Since the second reinforcing member 420, according to this example has a relatively large contact area contacting the barrel holder 300, the coupling force with the barrel holder 300 may be significantly improved.

The second reinforcing member 420 may be formed to protrude inwardly of the hole 302. In an example, a shortest distance Rhm from the center of the hole 302 to the second reinforcing member 420 may be less than the radius Rh of the hole 302. However, Rhm is not necessarily less than Rh. In an example, Rhm and Rh may be formed in the same size such that the lens barrel 200 is easily fitted into the hole 302 of the barrel holder 300.

In an example, the second reinforcing member 420 may be formed of a metal material, and may be integrally formed with the barrel holder 300. In an example, the second reinforcing member 420 may be integrally formed with the barrel holder 300 through an insert injection method. Therefore, the second reinforcing member 420 may be firmly bound to the barrel holder 300 and may not be easily separated or detached from the barrel holder 300 by external impacts.

Figure 5:
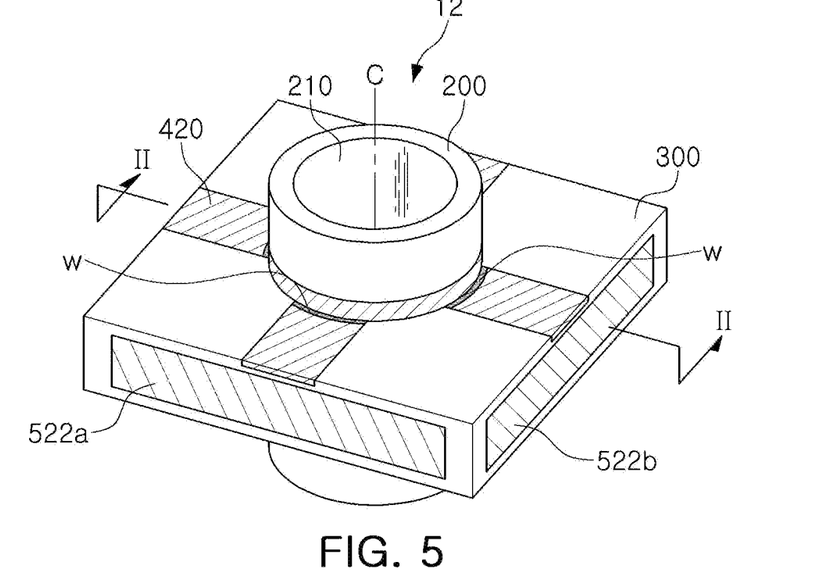
FIG. 5 is a perspective view of the example camera module illustrated in FIG. 4.
Figure 6:
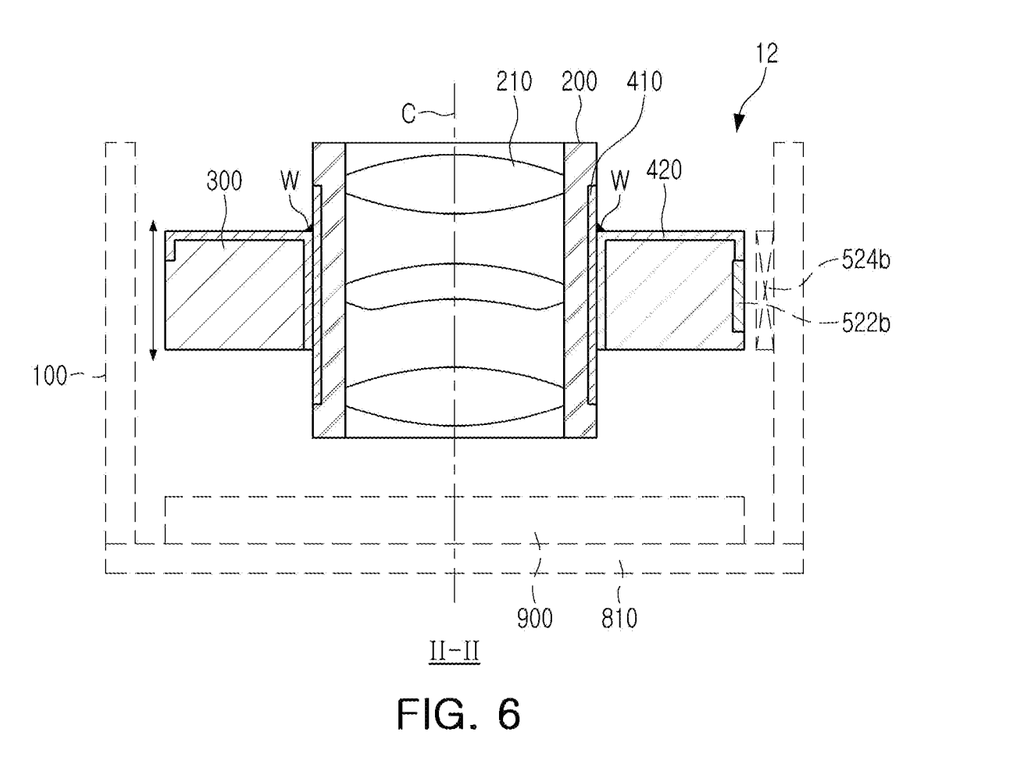
FIG. 6 is a cross-sectional view of the example camera module illustrated in FIG. 5.

The lens barrel 200 and the barrel holder 300 may be combined as illustrated in FIGS. 5 and 6. In an example, the lens barrel 200 may be coupled to the barrel holder 300 such that it is fitted into the hole 302 of the barrel holder 300. The lens barrel 200 and the barrel holder 300 may be rigidly coupled by bonding of the reinforcing members 410 and 420. In an example, the permanent coupling between the lens barrel 200 and the barrel holder 300 may be obtained by fusion bonding between the first reinforcing member 410 and the second reinforcing member 420. The melt bonding (W) between the first reinforcing member 410 and the second reinforcing member 420 may be performed by a method such as, but not limited to, laser welding.

The lens barrel 200 and the barrel holder 300 may move in a direction intersecting the optical axis C. Specifically, the lens barrel 200 may move in a direction intersecting the optical axis direction C by an interaction between second driving magnets 522a and 522b mounted on the barrel holder 300 and second driving coils 524a and 524b disposed on the housing 100.

The housing 100 may be configured to accommodate the lens barrel 200, the barrel holder 300, the second driving units 520a and 520b, the substrate 810, and the image sensor 900. The housing 100 may be configured in a form in which upper and lower portions are open. However, the open portion of the housing 100 is not limited to the upper and lower portions. In an example, at least one side of the housing 100 may be formed to be open as necessary. The substrate 810 may be disposed in a lower portion of the housing 100. The image sensor 900 and other electronic components that control the image sensor 900 may be mounted on the substrate 810. An electric circuit may be printed on the substrate 810. In an example, an electric circuit that transmits a control signal to the image sensor 900 and the second driving unit 520a and 520b may be printed on the substrate 810. The substrate 810 may have a multilayer structure. In an example, the substrate 810 may be formed of a laminated structure of a circuit board on which an electric circuit is printed.

In the example camera module 12, the reliability of coupling between the lens barrel 200 and the barrel holder 300 may be improved even in a structure configured to move the lens barrel 200 in a direction intersecting the optical axis.

Next, an example camera module, in accordance with one or more embodiments, will be described with reference to FIGS. 7 to 10.

Figure 7:
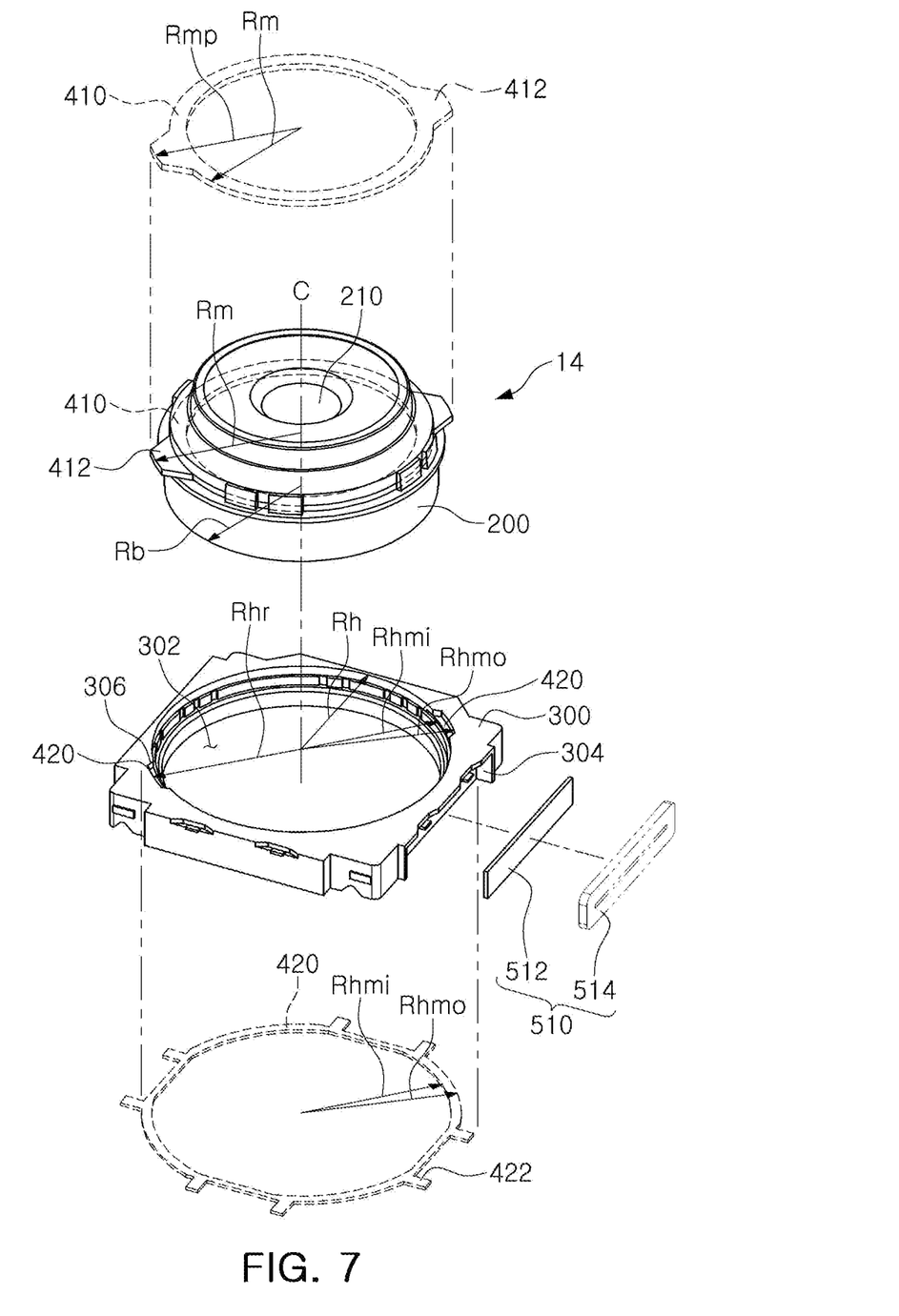
FIG. 7 is an exploded perspective view of an example camera module, in accordance with one or more embodiments.

A camera module 14, in accordance with one or more embodiments, may include a lens barrel 200, a barrel holder 300, and a first driving unit 510. The camera module 14 may further include a configuration necessary for imaging. In an example, the camera module 14 may further include an image sensor and a housing (see FIGS. 3 and 6).

The lens barrel 200 may be formed in a truncated conical shape having an upper diameter smaller than a lower diameter. However, the shape of the lens barrel 200 is not limited to having a truncated cone shape. The lens barrel 200 is configured to accommodate one or more lenses 210. In an example, one or more lenses 210 may be sequentially stacked in the lens barrel 200 in the optical axis C direction.

The barrel holder 300 may be configured to be coupled to the lens barrel 200. In an example, an open hole 302 may be formed in the center of the barrel holder 300 such that the lens barrel 200 may be inserted thereinto. The hole 302 may be open in the optical axis (C) direction. The center of the hole 302 may be formed to coincide with the optical axis C of the lens barrel 200. A radius Rh of the hole 302 may be substantially equal to, or greater than, a maximum radius Rb of the lens barrel 200. The barrel holder 300 may be configured to receive a portion of the first driving unit 510. In an example, a mounting groove 304 may be formed in one side of the barrel holder 300, in which a portion of the first driving unit 510 may be disposed.

The first driving unit 510 may be configured to enable autofocusing of the camera module 14. In an example, the first driving unit 510 may move the lens barrel 200 and the barrel holder 300 in the optical axis (C) direction. The first driving unit 510 may include a first driving magnet 512 and a first driving coil 514. The first driving magnet 512 and the first driving coil 514 may be disposed to face different members of the camera module 10. For example, the first driving magnet 512 may be disposed in the mounting groove 304 of the barrel holder 300, and the first driving coil 514 may be disposed in the housing of the camera module 14.

The camera module 14 may further include a first reinforcing member 410 and a second reinforcing member 420 that reinforce a binding between the lens barrel 200 and the barrel holder 300. The reinforcing members 410 and 420 may be formed of a material different from a material of the lens barrel 200 and a material of the barrel holder 300. In an example, the reinforcing members 410 and 420 may be formed of a material having greater rigidity than a material of the lens barrel 200 and the barrel holder 300. As another example, the reinforcing members 410 and 420 may be formed of a material having a higher melting point than a melting point of the lens barrel 200 and the barrel holder 300. For reference, in this example, the lens barrel 200 and the barrel holder 300 may be formed of plastic, and the reinforcing members 410 and 420 may be formed of a metal.

The reinforcing members 410 and 420 may be formed on the lens barrel 200 and the barrel holder 300. For example, the first reinforcing member 410 may be formed on the lens barrel 200, and the second reinforcing member 420 may be formed on the barrel holder 300.

The first reinforcing member 410 may be formed in a ring shape having a predetermined radius Rm. The first reinforcing member 410 may include a plurality of protrusions 412. The protrusions 412 may be formed to protrude in a radial direction. The protrusions 412 may be configured in plural. In an example, the first reinforcing member 410 may include two protrusions 412 as illustrated in FIG. 7. However, the number of protrusions 412 formed on the first reinforcing member 410 is not limited to two. In an example, the first reinforcing member 410 may include three or more protrusions 412. The radius Rm of the first reinforcing member 410 may be smaller than the radius Rh of the hole 302.

In a non-limiting example, the first reinforcing member 410 may be formed of a metal material, and may be integrally formed with the lens barrel 200. In an example, the first reinforcing member 410 may be integrally formed with the lens barrel 200 through an insert injection method. Therefore, the first reinforcing member 410 may be firmly bound to the lens barrel 200, and may not be easily separated or detached from the lens barrel 200 by external impacts. The protrusion 412 of the first reinforcing member 410 may be formed to protrude to the outside of the lens barrel 200. In an example, the distance Rmp from the center of the lens barrel 200 to the end of the protrusion 412 may be greater than a maximum radius Rb of the lens barrel 200. Additionally, Rmp may be greater than the radius Rh of the hole 302.

The second reinforcing member 420 may be formed in a substantially ring shape. An inner radius Rhmi of the second reinforcing member 420 may be greater than the maximum radius Rb of the lens barrel 200 and the radius Rh of the hole 302 and may be less than Rmp. An outer radius Rhmo of the second reinforcing member 420 may be greater than Rmp. The second reinforcing member 420 may include a plurality of protrusions 422. The protrusions 422 may be used to increase the coupling force with the barrel holder 300.

In a non-limiting example, the second reinforcing member 420 may be formed of a metal material, and may be integrally formed with the barrel holder 300. In an example, the second reinforcing member 420 may be integrally formed with the barrel holder 300 through an insert injection method. Therefore, the second reinforcing member 420 may be firmly bound to the barrel holder 300 and may not be easily separated or detached from the barrel holder 300 by external impacts. A portion of the second reinforcing member 420 may be exposed to the outside of the barrel holder 300. In an example, a portion of the second reinforcing member 420 may be exposed through a groove 306 of the barrel holder 300. The groove 306 of the barrel holder 300 may be formed to accommodate the protrusion 412 of the first reinforcing member 410. In an example, a distance Rhr from the center of the barrel holder 300 to an inner side of the groove 306 may be greater than the distance Rmp from the center of the lens barrel 200 to the end of the protrusion 412.

Figure 8:
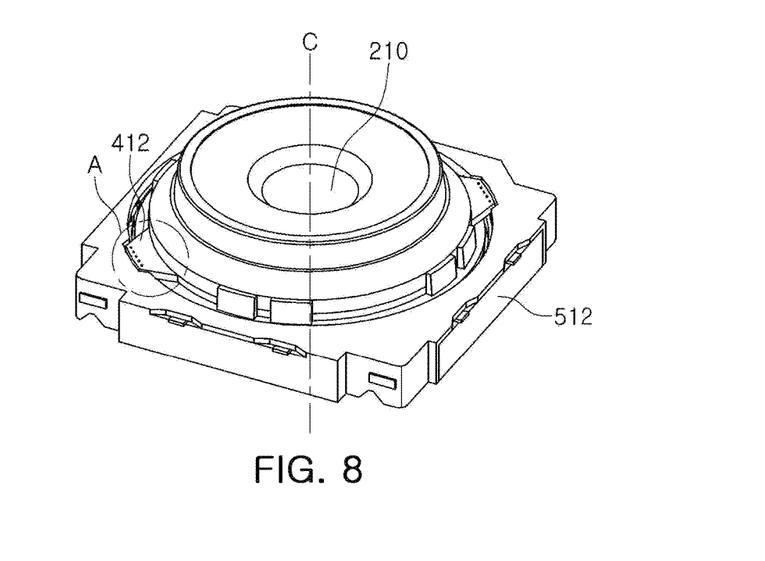
FIG. 8 is a perspective view illustrating the example camera module illustrated in FIG. 7.

The lens barrel 200 and the barrel holder 300 may be combined in the form illustrated in FIG. 8. In an example, the lens barrel 200 may be coupled to the barrel holder 300 in a manner that fits the lens barrel 200 into the hole 302 of the barrel holder 300. In the coupled state of the lens barrel 200 and the barrel holder 300, the protrusion 412 of the first reinforcing member 410 may contact the second reinforcing member 420 exposed through the groove 306.

Figure 9:
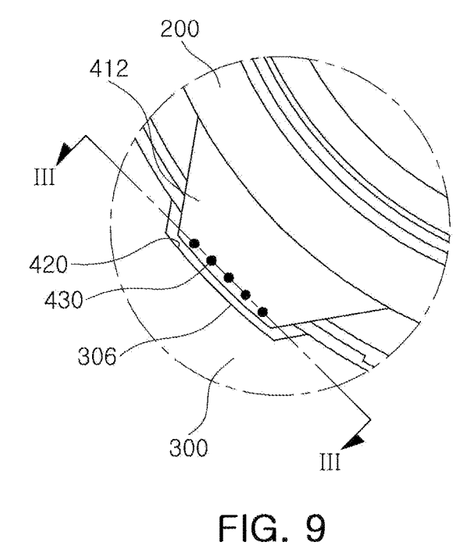
FIG. 9 is a partially enlarged view of the example camera module illustrated in FIG. 8.
Figure 10:
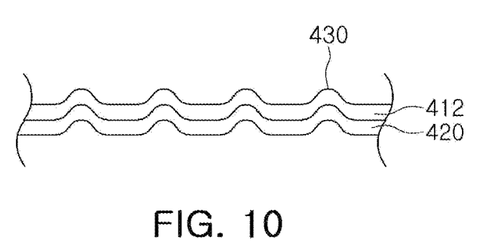
FIG. 10 is a cross-sectional view of a portion of the example camera module illustrated in FIG. 9.

The lens barrel 200 and the barrel holder 300 may be rigidly coupled by bonding of the reinforcing members 410 and 420. In an example, the permanent coupling between the lens barrel 200 and the barrel holder 300 may be obtained by fusion bonding between the first reinforcing member 410 and the second reinforcing member 420. The melt bonding (W) between the first reinforcing member 410 and the second reinforcing member 420 may be performed by a method such as laser welding or the like. A bonding portion 430 of the first reinforcing member 410 and the second reinforcing member 420 may have a unique shape by laser welding or spot welding. In an example, the bonding portion 430 may have irregularities formed by laser welding or spot welding. The number of bonding portions 430 may be increased or decreased depending on the size and weight of the lens barrel 200 and the barrel holder 300. The convex or concave shape of the bonding portion 430 may enhance the bonding force between the first reinforcing member 410 and the second reinforcing member 420, thereby increasing reliability of bonding force between the lens barrel 200 and the barrel holder 300.

The lens barrel 200 and the barrel holder 300 may move in the direction of the optical axis C. Specifically, the lens barrel 200 may move in the optical axis (C) direction by an interaction between the first driving magnet 512 mounted on the barrel holder 300 and the first driving coil 514 disposed on the housing 100.

Since the bonding strength between the first reinforcing member 410 and the second reinforcing member 420 may be increased in the camera module 14 configured as above, the coupling reliability between the lens barrel 200 and the barrel holder 300 may be further improved.

Next, an example camera module, in accordance with one or more embodiments, will be described with reference to FIGS. 11 to 14.

Figure 11:
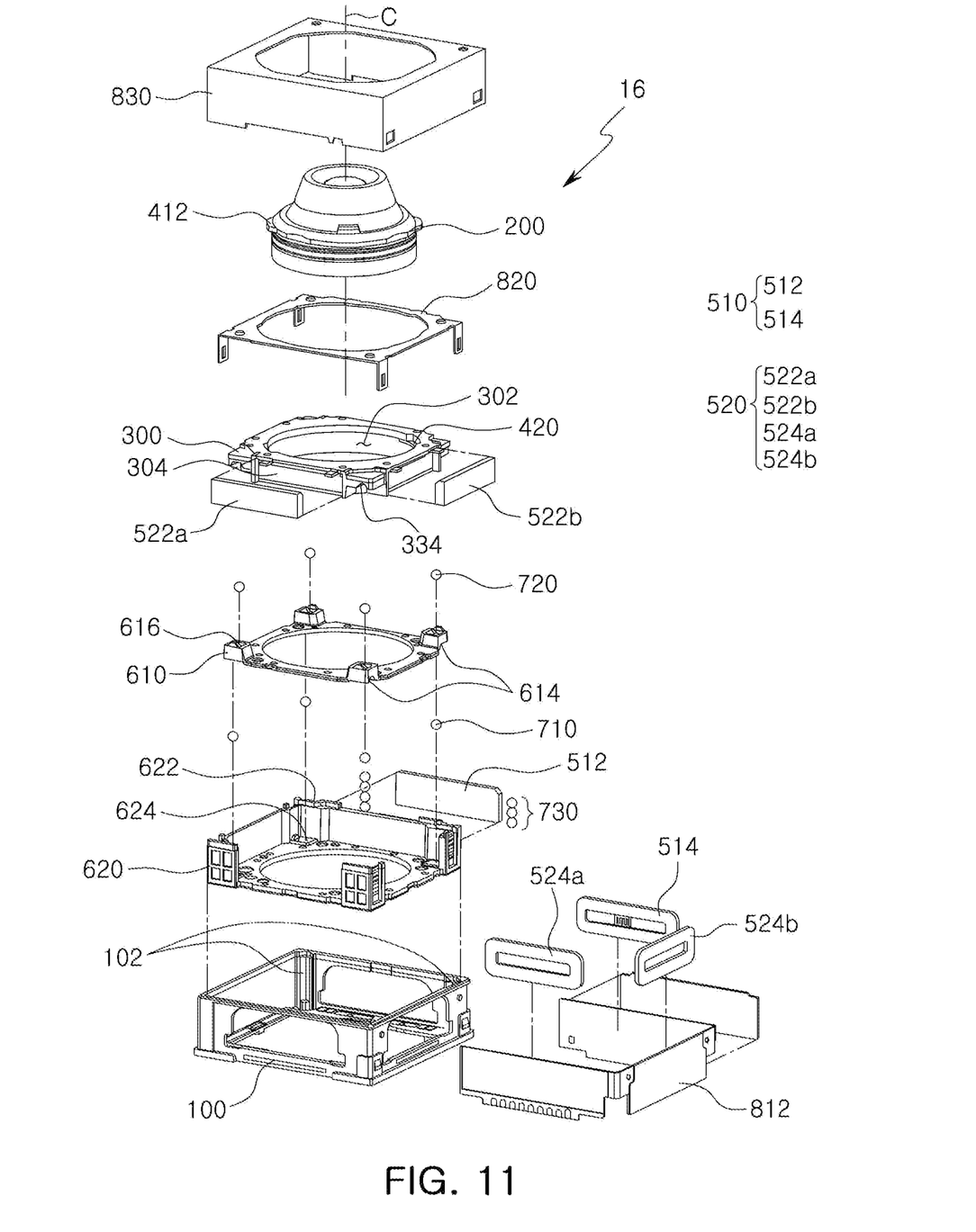
FIG. 11 is an exploded perspective view of an example camera module, in accordance with one or more embodiments.

A camera module 16, according to an example, includes a lens barrel 200, a barrel holder 300, a first movable frame 610, a second movable frame 620, a housing 100, a first driving unit 510, and a second driving unit 520. Additionally, the camera module 16 may further include a flexible substrate 812, a fixing clip 820, a shield can 830, and ball bearings 710, 720 and 730.

The lens barrel 200 may be formed to have a truncated cone shape having an upper portion smaller than a lower portion. The lens barrel 200 may be configured to receive a lens. In an example, one or more lenses may be sequentially stacked in the lens barrel 200 in the optical axis (C) direction.

The barrel holder 300 may be configured to be coupled to the lens barrel 200. In an example, an open hole 302 may be formed in the center of the barrel holder 300 such that the lens barrel 200 may be inserted therein. The hole 302 may be open in the optical axis (C) direction. The center of the hole 302 may be formed to coincide with the optical axis C of the lens barrel 200. The barrel holder 300 may be configured to receive at least a portion of the second driving unit 520. In an example, two mounting grooves 304 may be formed in two side surfaces of the barrel holder 300, and the second driving magnets 522a and 522b, which are portions of the second driving unit 520, may be disposed in the two mounting grooves 304.

The first movable frame 610 may be configured to support the barrel holder 300. The first movable frame 610 may support the barrel holder 300 such that the barrel holder 300 may move. In an example, the barrel holder 300 may move in a first direction intersecting the optical axis C, on the first movable frame 610. A ball bearing 710 may be disposed between the barrel holder 300 and the first movable frame 610. Specifically, the ball bearing 710 may be disposed between a guide groove 334 of the barrel holder 300 and a groove 616 of the first movable frame 610 to enable the barrel holder 300 to move.

The second movable frame 620 may be configured to support the first movable frame 610. The second movable frame 620 may support the first movable frame 610 such that the first movable frame 610 may move. The first movable frame 610 may move on the second movable frame 620 in a second direction intersecting the optical axis C. A ball bearing 720 may be disposed between the first movable frame 610 and the second movable frame 620.

Specifically, the ball bearing 720 may be disposed between the groove 616 of the first movable frame 610 and a guide groove 624 of the second movable frame 620 to enable the movement of the first movable frame 610. A first driving magnet 512, that is a part of the first driving unit 510, may be disposed on the second movable frame 620. In an example, the first driving magnet 512 may be mounted on one side of the second movable frame 620. The second movable frame 620 may be formed to have a form in which at least two sides are open. In an example, two adjacent side surfaces of the second movable frame 620 may be partially open in such a manner that second driving magnets 522a and 522b mounted on the barrel holder 300 face second driving coils 524a and 524b.

The housing 100 may be configured to accommodate the lens barrel 200, the barrel holder 300, the first movable frame 610, and the second movable frame 620. The housing 100 may accommodate the second movable frame 620 in such a manner that the second movable frame 620 may move. In an example, the second movable frame 620 may move in the direction of the optical axis C within the housing 100. A ball bearing 730 may be disposed between the housing 100 and the second movable frame 620. In an example, the ball bearing 730 may be disposed between a guide groove 102 of the housing 100 and the guide groove 622 of the second movable frame 620 to enable the movement of the second movable frame 620 in the optical axis direction. The housing 100 may be configured to have at least three open side surfaces. In an example, the three sides of the housing 100 may be partially open, such that the first driving magnet 512 of the second movable frame 620 and the second driving magnets 522a and 522b of the barrel holder 300 face the first driving coil 514 and the second driving coils 524a and 524b disposed on the periphery of the housing 100, respectively.

The first driving unit 510 may be configured to enable autofocusing of the camera module 16. In an example, the first driving unit 510 may move the lens barrel 200, the barrel holder 300 and the movable frames 610 and 620 in the direction of the optical axis C, through the magnetic force generated from the first driving magnet 512 and the first driving coil 514. Accordingly, the camera module 16 may perform autofocusing (AF) by changing the position of the lens barrel 200 in the optical axis direction through the first driving unit 510.

The second driving unit 520 is configured to enable optical image stabilization of the camera module 16. For example, the second driving unit 520 may move the lens barrel 200 and the barrel holder 300, or the lens barrel 200, the barrel holder 300, and the first movable frame 610 in a direction intersecting the optical axis C through the magnetic force generated from the second driving magnets 522a and 522b and the second driving coils 524a and 524b. Accordingly, the camera module 16 may perform the optical image stabilization (O1S) by changing a position of the lens barrel 200 in a direction intersecting the optical axis through the second driving unit 520.

The flexible substrate 812 is configured to support the first driving coil 514 and the second driving coils 524a and 524b. In an example, the flexible substrate 812 may enable the first driving coil 514 and the second driving coils 524a and 524b to be fixed onto open sides of the housing 100, in such a manner that the first driving coil 514 and the second driving coils 524a and 524b may face the first driving magnet 512 and the second driving magnets 522a and 522b, respectively. The flexible substrate 812 may be configured to provide current and control signals to the first driving coil 514 and the second driving coils 524a and 524b. In an example, the flexible substrate 812 may be connected to an external power supply and an external control device to supply current and control signals to the first driving coil 514 and the second driving coils 524a and 524b.

The fixing clip 820 may be configured to prevent separation of the barrel holder 300 and the first movable frame 610 from the second movable frame 620. In an example, the fixing clip 820 may be combined with the second movable frame 620 in a state in which the upper portion of the barrel holder 300 is pressed thereby, thus preventing the barrel holder 300 and the first movable frame 610 from being separated from the second movable frame 620.

The shield can 830 may be configured to shield a partial upper area and four side surfaces of the housing 100. The shield can 830 may be configured to prevent malfunction of the camera module 16 due to harmful electromagnetic waves. In an example, the shield can 830 may be formed of a metal material to block magnetic field interference of the first driving unit 510 and the second driving unit 520 due to harmful electromagnetic waves.

The camera module 16 may further include a first reinforcing member 410 and a second reinforcing member 420 that reinforce binding between the lens barrel 200 and the barrel holder 300. The reinforcing members 410 and 420 may be formed of a material different from a material of the lens barrel 200 and the barrel holder 300. In an example, the reinforcing members 410 and 420 may be formed of a material having greater rigidity than a material of the lens barrel 200 and the barrel holder 300. As another example, the reinforcing members 410 and 420 may be formed of a material having a higher melting point than the lens barrel 200 and the barrel holder 300. For reference, in this example, the lens barrel 200 and the barrel holder 300 may be formed of plastic, and the reinforcing members 410 and 420 may be formed of a metal.

The reinforcing members 410 and 420 may be formed on the lens barrel 200 and the barrel holder 300. In an example, the first reinforcing member 410 may be formed on the lens barrel 200, and the second reinforcing member 420 may be formed on the barrel holder 300. For reference, the reinforcing members 410 and 420 according to this example may be the same as or similar to those illustrated in FIGS. 7 to 10. In an example, a protrusion 412 may be formed on the first reinforcing member 410. The protrusions 412 may protrude at an interval in the circumferential direction of the lens barrel 200. The second reinforcing member 420 may be formed to be exposed externally through a groove of the barrel holder 300. The protrusion 412 of the first reinforcing member 410 is accommodated in the groove of the barrel holder 300, such that contact and bonding between the first reinforcing member 410 and the second reinforcing member 420 may be performed. The first reinforcing member 410 and the second reinforcing member 420 may be integrally formed with the lens barrel 200 and the barrel holder 300 through injection molding.

Figure 12:
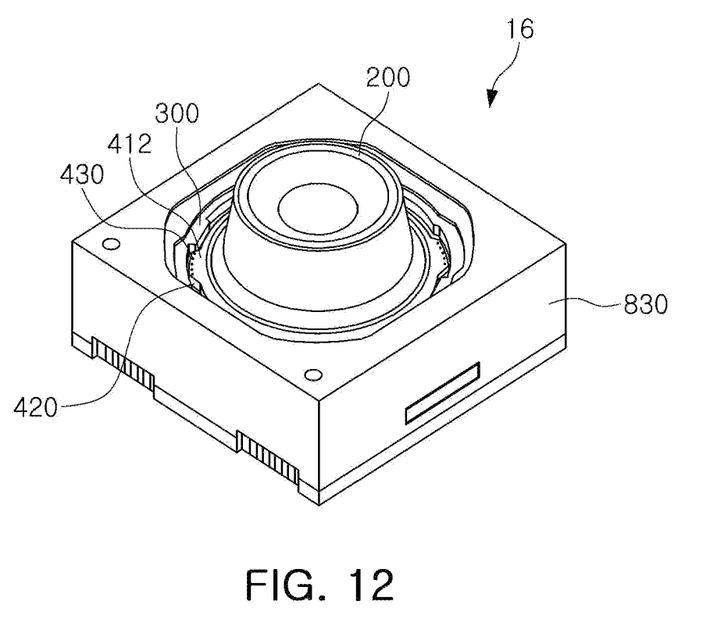
FIG. 12 is a perspective view of the example camera module illustrated in FIG. 11.

In the camera module 16 configured as above, the lens barrel 200 and the barrel holder 300, which are movable in the optical axis and a direction intersecting the optical axis, may be rigidly coupled through the reinforcing members 410 and 420, thereby improving operation reliability of the camera module 16.

Figure 13:
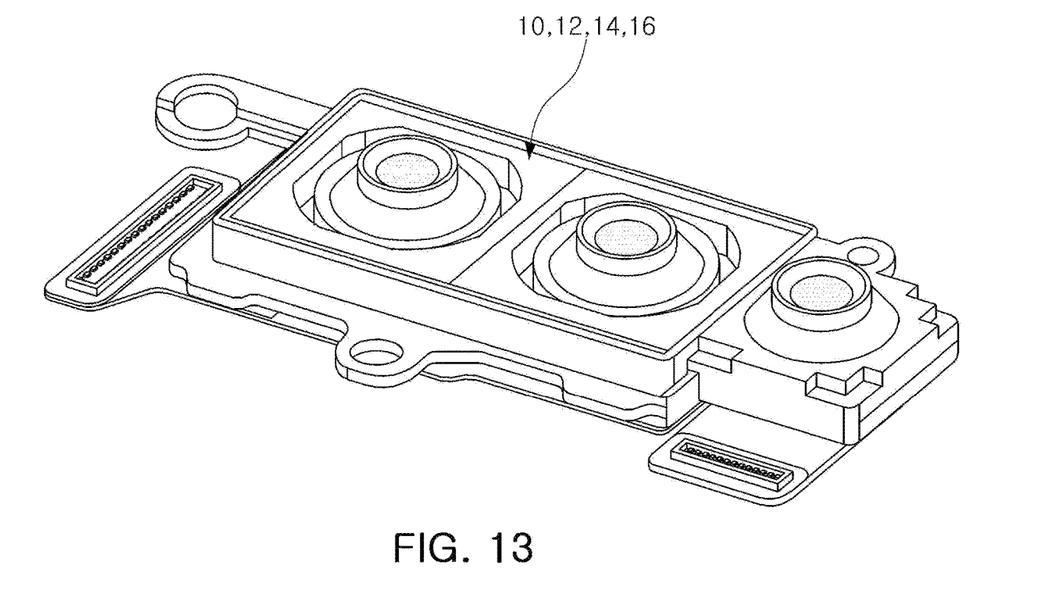
FIGS. 13 and 14 illustrate examples of a camera module, in accordance with one or more embodiments.
Figure 14:
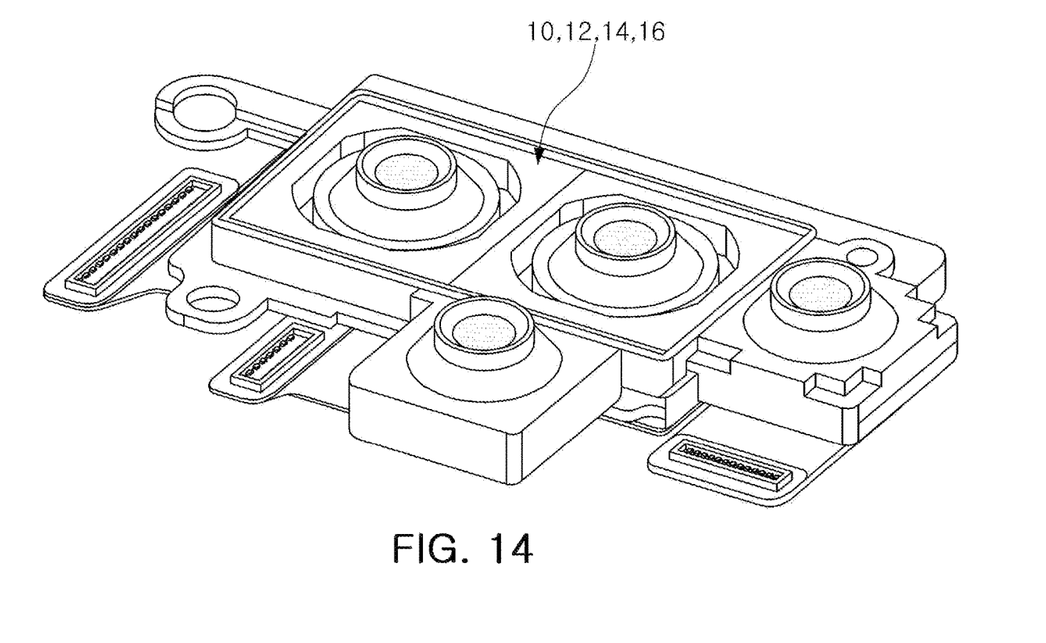

Next, FIGS. 13 and 14 illustrate examples of implementing the camera modules according to the above-described examples.

The camera modules 10, 12, 14 and 16 described above may sufficiently secure coupling reliability between the lens barrel 200 and the barrel holder 300 disposed to be movable inside of the camera module, and thus, may be mounted on various types of portable terminals.

In an example, the camera modules 10, 12, 14 and 16 may be continuously disposed in one direction or in a plurality of directions as illustrated in FIGS. 13 and 14 to improve the performance of the portable terminal. However, the form of the arrangement of the camera modules 10, 12, 14 and 16 is not limited to the form illustrated in FIGS. 13 and 14. In an example, the camera modules 10, 12, 14 and 16 may be mounted on a portable terminal in a single form.

As set forth above, a rigid coupling of a lens barrel and a barrel holder may be obtained. Accordingly, in a camera module according to an example, a resolution decrease due to poor coupling between a lens barrel and a barrel holder may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a lens barrel, configured to accommodate a lens;
    a barrel holder, configured to be coupled to the lens barrel;
    a first reinforcing member, disposed on the lens barrel;
    a second reinforcing member, disposed on the barrel holder, and configured to be melt-coupled to the first reinforcing member; and
    a driving unit, configured to move the lens barrel and the barrel holder in an optical axis direction,
    wherein a driving coil of the driving unit is disposed on a housing of the camera module, and a driving magnet of the driving unit is disposed on the barrel holder, and
    wherein a length of the first reinforcing member in the optical axis direction is longer than a length of the barrel holder in the optical axis direction.

2. The camera module of claim 1, wherein the first reinforcing member is disposed on a circumferential surface of the lens barrel, and
    wherein the second reinforcing member is disposed on an inner peripheral surface of the barrel holder facing the first reinforcing member.

3. The camera module of claim 2, comprising a bonding member, disposed at a boundary area between the first reinforcing member and the second reinforcing member.

4. The camera module of claim 1, wherein the first reinforcing member comprises a protrusion member that protrudes in a circumferential direction of the lens barrel.

5. The camera module of claim 4, wherein the barrel holder is provided with a groove that is configured to receive the protrusion member,
    wherein the second reinforcing member is disposed in the groove.

6. The camera module of claim 5, wherein the protrusion member is provided with irregularities disposed thereon.

7. The camera module of claim 1, wherein the first reinforcing member is plural in number, and are formed at predetermined intervals on a circumference of the lens barrel.

8. A camera module, comprising:
    a lens barrel, configured to accommodate a lens;
    a barrel holder, configured to be coupled to the lens barrel;
    a first reinforcing member, disposed on the lens barrel;
    a second reinforcing member, disposed on the barrel holder, and configured to be melt-coupled to the first reinforcing member; and
    a driving unit, configured to move the lens barrel and the barrel holder in an optical axis direction,
    wherein a driving coil of the driving unit is disposed on a housing of the camera module, and a driving magnet of the driving unit is disposed on the barrel holder, and
    wherein the first reinforcing member has a same length as a length of the lens barrel in an optical axis direction.

* * * * *